US012331191B2

(12) United States Patent
Jeong et al.

(10) Patent No.: US 12,331,191 B2
(45) Date of Patent: Jun. 17, 2025

(54) RUBBER COMPOSITION FOR SUSTAINABLE TIRE HAVING LIGNIN COMPOUNDS

(71) Applicant: Hankook Tire & Technology Co., Ltd., Seongnam-si (KR)

(72) Inventors: Da Mi Jeong, Daejeon (KR); Jeong Heon Kim, Dajeon (KR); Hak Joo Kim, Daejeon (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 297 days.

(21) Appl. No.: 17/198,579

(22) Filed: Mar. 11, 2021

(65) Prior Publication Data

US 2021/0395497 A1    Dec. 23, 2021

(30) Foreign Application Priority Data

Jun. 17, 2020  (KR) .................. 10-2020-0073388

(51) Int. Cl.
| | | |
|---|---|---|
| *C08L 7/00* | (2006.01) | |
| *B60C 1/00* | (2006.01) | |
| *C08K 3/04* | (2006.01) | |
| *C08L 97/00* | (2006.01) | |

(52) U.S. Cl.
CPC .............. *C08L 7/00* (2013.01); *B60C 1/0016* (2013.01); *C08L 97/005* (2013.01); *C08K 3/04* (2013.01)

(58) Field of Classification Search
CPC ........ C08L 7/00; C08L 97/005; B60C 1/0016; C08K 3/04
See application file for complete search history.

(56) References Cited

U.S. PATENT DOCUMENTS

| | | |
|---|---|---|
| 2009/0099281 A1 | 4/2009 | Sakurai et al. |
| 2010/0204368 A1 | 8/2010 | Benko et al. |

FOREIGN PATENT DOCUMENTS

| | | | |
|---|---|---|---|
| CN | 105960433 A | 9/2016 | |
| CN | 111892716 A | 11/2020 | |
| EP | 3059274 A1 | 8/2016 | |
| EP | 2935447 B1 | 2/2017 | |
| GB | 717971 A | 11/1954 | |
| JP | H05-098082 A | 4/1993 | |
| JP | 2009108308 A | 5/2009 | |
| JP | 2010059327 A | 3/2010 | |
| JP | 6500038 B2 | 2/2017 | |
| JP | 2017505855 A | 2/2017 | |
| JP | 2019537660 A | 12/2019 | |
| WO | 2015056758 A1 | 4/2015 | |
| WO | WO-2015114610 A1 * | 8/2015 | ........... B60C 1/0016 |
| WO | 2017/109672 A1 | 6/2017 | |
| WO | 2018099820 A1 | 6/2018 | |

OTHER PUBLICATIONS

Decision to Grant issued for KR Patent Application Serial No. 10-2020-0073388 dated Jan. 25, 2022, with English Machine Translation.
Office Action issued for CN patent application serial No. 202110278203.7, dated Nov. 30, 2022 with English machine translation.
European Search Report issued for EP patent application serial No. 21162135.4, dated Sep. 9, 2021.
Office Action issued for KR patent application serial No. 10-2020-0073388, dated Jun. 29, 2021, with English machine translation.
Office Action issued for JP patent application serial No. 2021-057782, dated Apr. 26, 2022 with English machine translation.

* cited by examiner

*Primary Examiner* — Angela C Scott
(74) *Attorney, Agent, or Firm* — Knobbe, Martens, Olson & Bear, LLP

(57) ABSTRACT

The present invention relates to a rubber composition for a tire, which includes 100 parts by weight of raw material rubber, 1 to 20 parts by weight of a lignin-based antioxidant, and 0.1 to 3 parts by weight of a crosslinking agent.

10 Claims, No Drawings

RUBBER COMPOSITION FOR SUSTAINABLE TIRE HAVING LIGNIN COMPOUNDS

CROSS-REFERENCE TO RELATED APPLICATION

This application claims priority to Korean Patent Application No. 10-2020-0073388, filed on Jun. 17, 2020, the disclosure of which is incorporated by reference herein in its entirety.

BACKGROUND OF THE INVENTION

1. Field of the Invention

The present invention relates to a rubber composition for a tire, including 100 parts by weight of raw material rubber, 1 to 20 parts by weight of a lignin-based antioxidant, and 0.1 to 3 parts by weight of a crosslinking agent, and more particularly, to a rubber composition for a tire, which has an excellent oxidation inhibiting effect even without using existing petroleum-based antioxidants, by using an aminated lignin analogue as an antioxidant.

2. Description of the Related Art

As high industrialization is in progress over the world, environmental contamination problems are emerging as serious issues. Accordingly, the concerns about environment are ever increasing, and it is a general tendency that environmental regulations are being fortified in overall industry.

Likewise, it is the current situation in the tire industry that environmental regulatory laws concerning the tire raw material, manufacturing method, and the like have been established and managed in individual countries, and as environmental regulations are anticipated to be further fortified in the future, there is a demand for active research on sustainable tires.

Particularly, in the rubber compositions constituting tires, not only naturally occurring components such as natural rubber, but also petroleum-based compounds obtained by decomposition, purification, and synthesis from petroleum-based raw materials are widely used, so that the rubber compositions tend to have high carbon emissions.

For example, synthetic rubbers, synthetic oils, and various synthetic additives generally originate from petroleum-based compounds, and since additional energy should be applied every time those compounds are deformed and decomposed through various processes, the carbon emissions are more significantly increased.

In this regard, as one of the efforts to be made to reduce carbon emission, that is, the discharge of carbon dioxide, attention has been paid to the "carbon neutrality program". "Carbon neutrality" is an environmental campaign of making the emission of carbon dioxide substantially "zero (0)". Even in the field of chemistry, efforts have been made to reduce the emissions of carbon dioxide by using naturally occurring raw materials as received, or by using carbon neutral materials obtained by processing naturally occurring raw materials at the minimal level.

For example, when tires are manufactured using rubber compositions containing lignin and cellulose, which are natural polymers obtained from plants, reduction of carbon dioxide emissions brought by the use of carbon neutral materials and countermeasures against petroleum resource depletion can be promoted from a social point of view, and there is an advantage that problems such as release of volatile organic compounds from tires in the case of using tire compositions including petroleum-based compounds can be solved or reduced.

On the other hand, cellulose and lignin, which are the most abundant natural polymer substances on earth, are environment-friendly carbon neutral substances that are readily suppliable and inexpensive. In particular, lignin is an oil-soluble phenolic polymer which is one of the components constituting the wood part of soft wood and hard wood, and various attempts to utilize lignin have been continuously made.

Recently, there have been attempts in the tire industry to use small amounts of 1 wt % to 2 wt % lignin to additives, rubber, and prepolymers such as phenol-formaldehyde and urea-formaldehyde; however, since those components have low molecular weights and form intermolecular hydrogen bonds, there is a problem that the components do not melt at high temperatures but undergo thermal decomposition. Thus, there are limitations on the use with a restricted range of usage.

In developing countries where the domestic industrial foundation is insufficient to undertake the initiative in lignin-related industries, no substantial development of fundamental technologies concerning lignin and cellulose has been achieved, and it is the current situation that only academic studies on the separation and purification, structural analysis, and chemical characteristics of lignin as a natural product have been intermittently carried out in universities and research institutes.

The inventors of the present invention have recognized problems such as described above and conducted an investigation to solve the problems, and as a result, the inventors found a novel rubber composition for a tire, which can reduce carbon dioxide emissions and lower the production cost by utilizing lignin, a naturally occurring material, and which suggests to develop substituent materials in preparation for petroleum resource depletion. Thus, the inventors completed the present invention.

SUMMARY OF THE INVENTION

An object of the present invention is to provide a rubber composition for a tire, which utilizes a carbon neutral material while suppressing the use of compounds originating from petroleum resources.

Particularly, it is the object of the present invention to provide a rubber composition for a tire, which can inhibit oxidation of the rubber composition for a tire by adding a lignin-based antioxidant derived from natural materials, instead of petroleum-based antioxidants.

The present invention is intended to provide a rubber composition for a tire, which includes a lignin-based antioxidant that has no risk of releasing volatile organic substances that are released from petroleum-based antioxidants.

The present invention is intended to provide a rubber composition for a tire with low production cost by adding a lignin-based antioxidant instead of expensive petroleum-based antioxidants.

It is another object of the present invention to provide a tire manufactured using the rubber composition for a tire according to the present invention.

In order to solve the problems described above, according to an aspect of the present invention, there is provided a rubber composition including 100 parts by weight of raw material rubber, 1 to 20 parts by weight of a lignin-based antioxidant, and 0.1 to 3 parts by weight of a crosslinking agent.

According to an embodiment of the present invention, the lignin-based antioxidant may include any one or more selected from the group consisting of lignin and a lignin analogue.

According to an embodiment of the present invention, the lignin-based antioxidant may include a lignin analogue, and the lignin analogue may be an aminated lignin analogue, which contains an amine group at the ortho- and/or meta-position with respect to the hydroxy group of lignin.

According to an embodiment of the present invention, the lignin-based antioxidant may have a weight average molecular weight of 200 to 10,000 g/mol.

According to another embodiment of the present invention, the amine group of the aminated lignin analogue may contain one or more carbon chains having 1 to 6 carbon atoms.

According to another embodiment of the present invention, the raw material rubber may include natural rubber, a reinforcing filler may be included at a proportion of 40 to 50 parts by weight with respect to 100 parts by weight of the raw material rubber, and the reinforcing filler may include carbon black.

According to an embodiment of the present invention, the rubber composition for a tire may be incorporated into any one or more parts selected from the group consisting of a tread part, a sidewall part, a carcass part, a belt part, a bead part, an undertread (U/T) part, and an inner liner part of a tire.

According to another aspect of the present invention, there is provided a tire including the above-described rubber composition for a tire.

The present invention has an effect that oxidation is inhibited without using a petroleum-based antioxidant.

The present invention has an effect that carbon dioxide emissions can be reduced, and release of volatile organic substances can be prevented, by utilizing lignin, which is a natural material.

Furthermore, the present invention has an excellent oxidation preventive effect without using expensive petroleum-based antioxidants and has an effect of lowering the production cost and materials cost.

DETAILED DESCRIPTION OF THE PREFERRED EMBODIMENTS

In the following description, various embodiments of the present invention will be described in more detail so that those having ordinary skill in the art to which the present invention is pertained can easily carry out the invention; however, these embodiments are only for illustrative purposes, and the scope of rights of the present invention is not intended to be limited by the following matters.

The rubber composition for a tire according to the present invention includes 100 parts by weight of raw material rubber, 1 to 20 parts by weight of a lignin-based antioxidant, and 0.1 to 3 parts by weight of a crosslinking agent.

A tire includes a synthetic rubber or natural rubber as a main component, and when rubber components are exposed to oxygen or light, molecular chains in the rubber material are cleaved so that the rubber components may be oxidized. From the viewpoint that cleavage of rubber molecular chains eventually generates cracks on the tire surface and causes serious destruction of the tire, preventing oxidation of the tire is critical from the viewpoints of the product quality of the tire and the safety of users.

In order to prevent oxidation of the tire, an antioxidant is added to the rubber composition for a tire, and the antioxidant is a component that is added in order to prevent unsaturated bond portions in the chains of rubber or a polymer from being cleaved by oxygen or ozone, and to delay deterioration caused by aging so as to prolong the product life.

Antioxidants for tires can be roughly classified into static antioxidants and dynamic antioxidants. In the case of a static antioxidant, the antioxidant forms a film on the surface of the tire to prevent exposure of the tire surface to oxygen or ozone and thereby prevents oxidation of the tire. In the case of a dynamic antioxidant, when the antioxidant is incorporated into a rubber composition that constitutes a tire, the substance reacts with oxygen or ozone at the tire surface and prevents oxidation.

However, when a film is formed on the surface of a tire, the film may be easily damaged due to repeated friction with the road surface so that there is a problem of the duration of maintaining the oxidation preventive effect being short. Furthermore, dynamic antioxidants have a problem of being expensive from the viewpoint that petroleum-based compounds are mainly used.

In order to solve these problems, the present invention provides a rubber composition for a tire, which can prevent oxidation of a tire by using a lignin-based compound, which has high structural similarity to petroleum-based antioxidants, in substitution for petroleum-based antioxidants such as 6PPD (N-(1,3-dimethylbutyl)-N'-phenyl-p-phenylenediamine) having a structure represented by the following Chemical Formula 1, which has been widely used as a popular dynamic antioxidant.

[Chemical Formula 1]

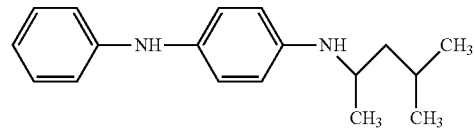

6PPD

Specifically, in the present invention, natural rubber or a synthetic rubber can be used as the raw material rubber, and preferably, natural rubber (NR) is used.

Natural rubber collectively refers to rubber that can be obtained from nature, and the place of origin and the like of the rubber are not limited. Common natural rubber and modified natural rubber can both be used. Natural rubber includes cis-1,4-polyisoprene as a main component; however, without limitations, natural rubber including trans-1,4-polyisoprene can also be used.

In particular, a feature of the present invention is that the rubber composition includes a lignin-based antioxidant instead of a petroleum-based antioxidant, as an antioxidant.

Examples of conventional petroleum-based antioxidants that can be replaced with the lignin-based antioxidant according to the present invention include antioxidants such as 6PPD (N-(1,3-dimethylbutyl)-N'-phenyl-p-phenylenediamine), 77PD (N,N'-bis-(1,4-dimethylpentyl)-p-phenylenediamine), IPPD (N-isopropyl-N'-phenyl-1,4-phenylenediamine), and TMQ (2,2,4-trimethyl-1,2-dihydroquinoline). As such, when a lignin-based antioxidant is added, instead of a petroleum-based antioxidant, to a rubber composition for a tire, for which petroleum-based antioxidants have been used, an oxidation preventive effect can be obtained.

Specifically, the lignin-based antioxidant may include any one or more selected from the group consisting of lignin and a lignin analogue.

Lignin means an oil-soluble phenolic polymer among the various constituent components that constitute the wood part of soft wood and hard wood, and lignin comprises a polymer having a complicated three-dimensional structure formed by monomers such as p-coumaryl alcohol (H), coniferyl alcohol (G), and sinapyl alcohol (S) through β-O-4 or carbon-carbon bonds.

The term lignin analogue means a compound that can become lignin when one atom or atomic group is substituted with another atom or atomic group. Accordingly, lignin analogues collectively refer to all compounds in which one atom or atomic group in the structure of lignin has been substituted with another atom or atomic group. Specifically, a lignin analogue may be a compound obtained by substituting one hydrogen atom that constitutes lignin with one of various functional groups such as a hydroxy group, an alkyl group, an alkenyl group, an alkenyl group, an amine group, and an amino group.

The lignin-based antioxidant is preferably a compound in which a hydrogen atom in a benzene ring that constitutes lignin has been substituted with one of the above-described functional groups, and more preferably a compound in which an amine group has been substituted at the ortho- and/or meta-position corresponding to $R^1$ to $R^3$ in the following Chemical Formula 2 with respect to the hydroxy group substituted at a benzene ring that constitutes lignin.

[Chemical Formula 2]

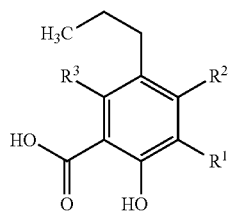

Preferably, the lignin-based antioxidant may include an amine group at the ortho-position with respect to the above-described hydroxy group, the amine group may contain one or more carbon chains each having 1 to 6 carbon atoms, and more particularly, the lignin-based antioxidant may be a compound represented by the following Chemical Formula 3.

[Chemical Formula 3]

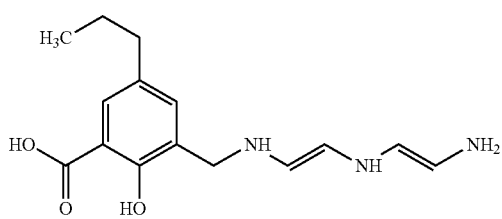

The compound represented by the above-described Chemical Formula 3 can be obtained by heating lignin together with formaldehyde (HCOH) and diethylenetriamine under basic conditions, as shown in the following Reaction Formula 1.

[Reaction Formula 1]

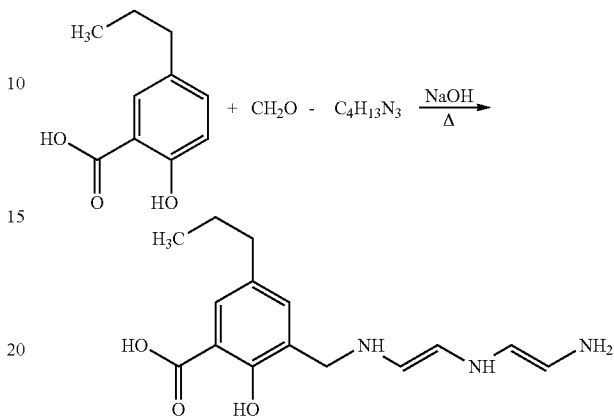

However, the above-described reaction and reaction conditions are merely an exemplary method for producing aminated lignin analogue according to the present invention, and the present invention is not limited thereto. Aminated lignin analogue can be produced by various reactions.

Regarding the lignin or lignin analogue as the lignin-based antioxidant, any type of lignin can be used without particular limitations, and examples include, but are not limited to, kraft lignin, lignosulfonate lignin, soda lignin, and mixtures of these.

On the other hand, the lignin-based antioxidant according to the present invention may have a weight average molecular weight of 200 to 10,000 g/mol, and the weight average molecular weight is preferably 500 to 7000 g/mol, and more preferably 1000 to 3000 g/mol.

In a case where the lignin-based antioxidant has a molecular weight larger than the above-described range, the rate of diffusion of the antioxidant is so slow that the antioxidant cannot protect rubber from oxidizing substances, and there is a problem that the oxidation preventive effect is lowered. In a case where the antioxidant has a molecular weight smaller than the above-described range, the rate of diffusion of the antioxidant is so fast that the antioxidant leaches out to the surface and causes a problem of inducing discoloration of the tire. Therefore, it is preferable to use a compound having a weight average molecular weight in the above-described range.

On the other hand, the lignin-based antioxidant can be incorporated into the rubber composition such that the amount of addition is preferably 1 to 20 parts by weight, and more preferably 1 to 10 parts by weight.

When a larger amount of the lignin-based oxidation than the above-described content is added, there is a problem that affects the vulcanization properties of rubber, and when a smaller amount of the lignin-based antioxidant than the above-described content is added, there is a problem that the oxidation preventive effect is negligible.

The crosslinking agent is not particularly limited and may be used as long as it can be used in the tire field.

The rubber composition for a tire according to an embodiment of the present invention may further include 40 to 50 parts by weight of the reinforcing filler with respect to 100 parts by weight of the raw material rubber.

When a smaller amount of the reinforcing filler than the above-described content is added, there is a problem of lowered reinforcement properties.

According to an embodiment of the present invention, the reinforcing filler is such that any reinforcing filler that is used in the technical field, such as carbon black or silica, can be used without any particular limitations. Preferably, the reinforcing filler may be carbon black.

The rubber composition for a tire according to the present invention can be incorporated into various parts that constitute a tire. Specifically, the rubber composition for a tire can be incorporated into any one or more parts selected from the group consisting of a tread part, a sidewall part, a carcass part, a belt part, a bead part, an undertread (U/T) part, and an inner liner part.

According to another embodiment of the present invention, there is provided a tire comprising the rubber composition for a tire according to the present invention.

The tire according to the present invention may be any one selected from the group consisting of a truck tire, a light truck radial (LTR) tire, a passenger car tire, and a racing car tire.

Hereinafter, Examples of the present invention will be described in detail so that those ordinarily skilled in the art to which the present invention is pertained can easily carry out the invention; however, these Examples are only for illustrative purposes, and the scope of rights of the invention is not limited by any of the following matters.

Production Example: Production of Rubber Composition for Tire Tread

Rubber compositions according to Example and Comparative Example having the compositions as shown in the following Table 1 were produced. The various compounds were weighed and mixed using a Banbury mixer, and then rubber sheets were produced.

TABLE 1

| (unit: phr) | Example 1 | Comparative Example 1 | Comparative Example 2 |
|---|---|---|---|
| NR | 100 | 100 | 100 |
| Carbon Black | 45 | 45 | 45 |
| 6PPD | — | 2 | — |
| Lignin | — | — | 2 |
| Aminated Lignin* | 2 | — | — |
| Crosslinking agent | 1.7 | 1.7 | 1.7 |
| Accelerator | 1.3 | 1.3 | 1.3 |

(*The aminated lignin is an aminated lignin represented by [Chemical Formula 3].)

[Chemical Formula 3]

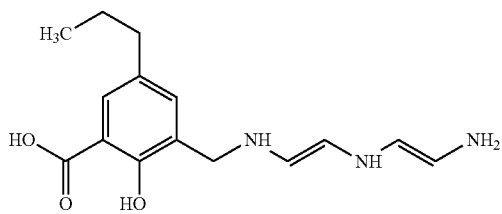

Experimental Example: Fatigue Resistance Evaluation Experiment

Fatigue resistance was evaluated by subjecting dumbbell type specimens to periodical constant displacements by various Drive Cams using a testing machine for measuring the fatigue life and the cut growth of vulcanized rubber and measuring the number of cycles upon breakage. The speed of rotation of Cam was measured under the conditions of 100 rpm (number of specimens: 6 specimens/b't) and a strain range of 60%, 80%, 100%, and 120%, and the results are shown in Table 2.

TABLE 2

| Cumulative probability (%) | Example 1 | Comparative Example 1 | Comparative Example 2 |
|---|---|---|---|
| 16 | 29,877 | 17,030 | 5,724 |
| 33 | 30,597 | 38,123 | 5,849 |
| 50 | 32,987 | 49,318 | 6,267 |
| 66 | 34,776 | 70,327 | 10,984 |
| 83 | 53,198 | 72,012 | 11,150 |
| 100 | 84,931 | 79,053 | 11,349 |

According to Table 2, Example 1 is a sample in which aminated lignin analogue was incorporated as an antioxidant into the rubber composition and shows fatigue resistance results at a level equal to or higher than that of Comparative Example 1 in terms of 100% cumulative probability. Furthermore, when Example 1 is compared with Comparative Example 2 in which non-aminated lignin analogue was used, it is confirmed that Example 1 shows higher fatigue resistance performance.

Accordingly, it was verified that aminated lignin analogue can be used as a natural antioxidant in substitution for existing petroleum-based antioxidants.

What is claimed is:

1. A rubber composition for a tire, the rubber composition comprising 100 parts by weight of a raw material rubber, 40 to 50 parts by weight of a reinforcing filler, 1 to 20 parts by weight of an antioxidant, and 0.1 to 3 parts by weight of a crosslinking agent,
   wherein the antioxidant includes a compound having the following chemical formula:

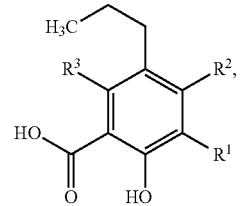

wherein at least one of $R^1$, $R^2$, and $R^3$ is a first functional group comprising an amine group,
   wherein when present, remaining one or ones of the $R^1$, $R^2$ and $R^3$ are a hydrogen atom or a functional group different from the first functional group, and
   wherein the reinforcing filler includes carbon black.

2. The rubber composition for a tire according to claim 1, wherein the antioxidant further includes lignin.

3. The rubber composition for a tire according to claim 1, wherein the antioxidant has a weight average molecular weight of 200 to 10,000 g/mol.

4. The rubber composition for a tire according to claim 1, wherein the amine group of the compound includes one or more carbon chains each having 1 to 6 carbon atoms.

5. The rubber composition for a tire according to claim 1, wherein the raw material rubber includes a natural rubber.

6. The rubber composition for a tire according to claim 1, wherein the rubber composition for the tire is incorporated into one or more parts selected from the group consisting of a tread part, a sidewall part, a carcass part, a belt part, a bead part, an undertread (U/T) part, and an inner liner part.

7. A tire comprising the rubber composition for a tire according to claim 1.

8. The rubber composition for a tire according to claim 1, wherein the compound has the amine group at the ortho-position with respect to the hydroxy group.

9. The rubber composition for a tire according to claim 8, wherein the compound has the following chemical formula:

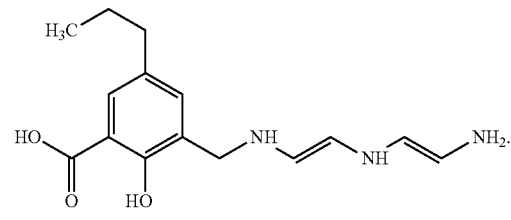 [SMILES: CCCc1cc(CN/C=C/N/C=C/N)c(O)c(C(=O)O)c1]

10. The rubber composition for a tire according to claim 1, wherein the at least one of the $R^1$, $R^2$, and $R^3$ is the first functional group comprising the amine group, and wherein at least one of the remaining one or ones of the $R^1$, $R^2$, and $R^3$ is selected from a group consisting of a hydroxy group, an alkyl group, an alkenyl group, an alkanyl group, and an amino group.

* * * * *